Aug. 30, 1938.　　　　S. B. CRARY　　　　2,128,802
AUTOMATIC RECLOSING CIRCUIT BREAKER SYSTEM
Filed March 10, 1937
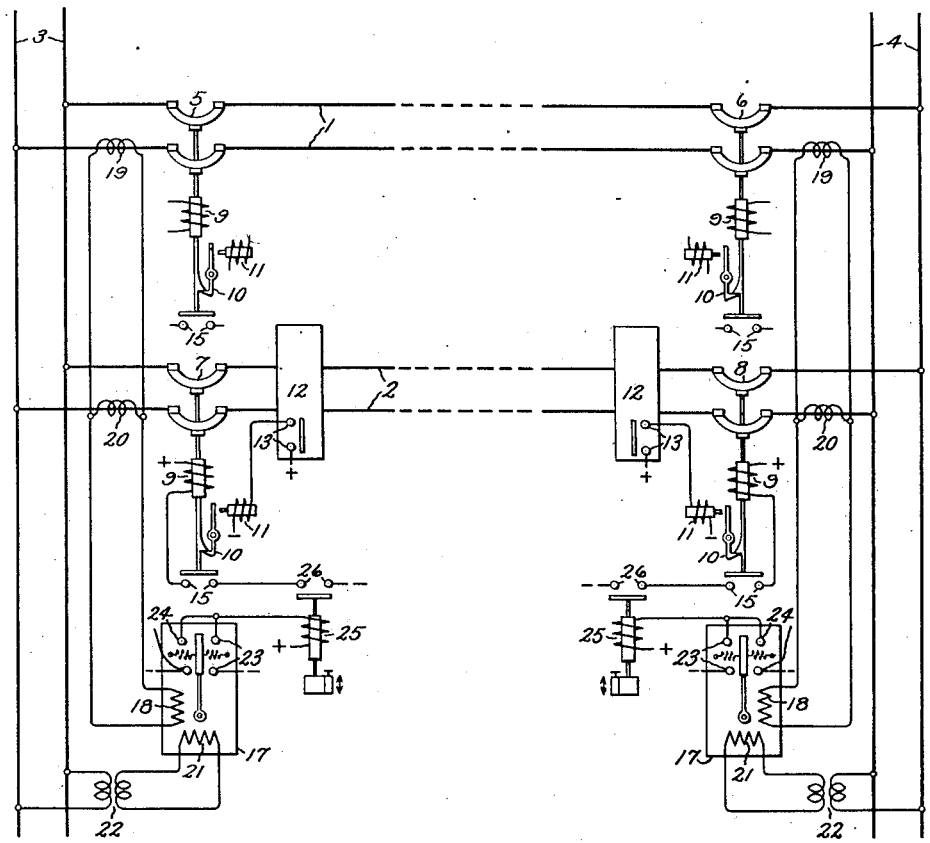
Inventor:
Selden B. Crary,
by Harry E. Dunham
His Attorney Patented Aug. 30, 1938

2,128,802

UNITED STATES PATENT OFFICE 2,128,802

AUTOMATIC RECLOSING CIRCUIT BREAKER SYSTEM

Selden B. Crary, Schenectady, N. Y., assignor to General Electric Company, a corporation of New York Application March 10, 1937, Serial No. 130,031

8 Claims. (Cl. 175—294)

My invention relates to automatic reclosing circuit breaker systems, and particularly to such systems for reclosing a circuit breaker in one of a plurality of parallel transmission lines after the breaker has been opened by a fault on the associated transmission line, and one object of my invention is to provide an improved arrangement for controlling the reclosing of such a circuit breaker.

In order to maintain an alternating current transmission system in synchronism between the various parts when a fault occurs on one or more of a plurality of parallel transmission lines, arrangements have been proposed heretofore for rapidly opening and reclosing the circuit breaker at each end of the faulty line or lines. However, I find that under certain conditions it is inadvisable to reclose the circuit breakers in the faulty line or lines quickly. For example, if the fault occurs on one of the lines at a time when the total power being transmitted by the parallel lines is of such a value that it can be carried by the remaining lines without the system losing synchronism, there is little to be gained by rapidly reclosing the circuit breakers in the faulty line, but synchronism may be lost by doing so because if the fault is still connected to the line or if it restrikes when the circuit breaker is reclosed, there is the possibility that the reconnection of the fault may cause the system to become unstable, and thereby effect the opening of the circuit breakers in the remaining lines or in other parts of the system. However, if a fault occurs on one of the lines at a time when the total power being transmitted by the parallel lines is of such a value that it cannot be carried by the remaining lines without the system becoming unstable, there is everything to be gained by rapidly reclosing the circuit breakers in the faulty line, as there is the possibility that the fault may have cleared or that it will not restrike when the circuit breakers are reclosed, in which event, service may be restored without the system losing synchronism. Therefore, in accordance with my invention, I provide an arrangement which permits the rapid reclosing of the circuit breakers in a faulty line only in response to a predetermined condition of the lines indicative that the reclosing thereof will prevent a loss of synchronism between the various parts of the system. One such indicative condition of the lines is the amount of power being transmitted by the parallel lines at the time the fault occurs.

My invention will be better understood from the following description when taken in connection with the accompanying drawing, the single figure of which illustrates an automatic reclosing circuit breaker arrangement embodying my invention, and its scope will be pointed out in the appended claims.

In the accompanying drawing, 1 and 2 represent two parallel transmission lines interconnecting the two buses 3 and 4. In order to simplify the disclosure, I have shown single phase circuits, but in practice they are usually polyphase circuits. The transmission line 1 is connected to the bus 3 by a suitable circuit breaker 5 and to the bus 4 by a suitable circuit breaker 6. Similarly, the transmission line 2 is respectively connected to the buses 3 and 4 by suitable circuit breakers 7 and 8. Preferably, each of these circuit breakers is designed in any suitable manner, examples of which are well-known in the art, so that its opening and closing times are very short. Also preferably, each circuit breaker is arranged so that it will be automatically opened when a fault occurs on its associated transmission line and will be rapidly reclosed thereafter under certain conditions. In order to simplify the disclosure, each circuit breaker is shown as a latched-in circuit breaker which is closed by a closing coil 9 when it is energized and which is held in its closed position by a latch 10 that is released by a trip coil 11 when it is energized. Any suitable relay protective means, examples of which are well-known in the art, may be provided for effecting the energization of the trip coil 11 of a circuit breaker when a fault occurs on the associated line. Since the details of such fault responsive means form no part of my present invention, I have represented such means in connection with the circuit breakers 7 and 8 in the line 2 by a rectangle 12 containing contacts 13, which are closed to complete an energizing circuit for the associated trip coil 11 when a fault occurs on the associated line. Each of the circuit breakers 5 and 6 may be provided with similar relay protective means which responds to a fault on the line 1.

For effecting a rapid automatic reclosing of a circuit breaker after it opens, each circuit breaker is provided with auxiliary contacts 15 which are closed by the circuit breaker when it is open. These contacts 15 are connected in the energizing circuit of the closing coil 9 of the associated circuit breaker. In accordance with my invention, I also control the energizing circuit of the closing coil 9 of a circuit breaker in response to the total amount of power being transmitted by the two transmission lines 1 and 2 at the time the fault occurs so that if the total power being transmitted is a value which the remaining line can carry without the system becoming unstable, the circuit breaker in the faulty line is prevented from being reclosed, but if the total load being transmitted at the time the fault occurs is above such a value, the reclosing means for the circuit breaker in the faulty feeder is rendered operative. For accomplishing this result in the arrangement shown in the drawing, each circuit breaker has associated therewith a power responsive relay 17 which is connected to respond to the total power being transmitted by the two lines. However, in order to simplify the disclosure, relays 17 are shown associated with the circuit breakers 7 and 8 in the line 2. Each power relay 17 has its current winding 18 respectively connected to the lines 1 and 2 by current transformers 19 and 20 so that the current winding 18 is energized in accordance with the total current being supplied by the two lines 1 and 2 and has its voltage winding 21 connected by means of a voltage transformer 22 so that it is energized in accordance with the voltage of the associated line. Each power relay 17 is adjusted to close its contacts 23 when the total power being transmitted over the two lines in one direction exceeds a predetermined value and to close its contacts 24 when the total power being transmitted by the two lines in the other direction exceeds a predetermined value. The contacts 23 and 24 of each relay 17 are connected in the energizing circuit of an associated relay 25, which in turn controls contacts 26 in the energizing circuit of the closing coil 9 of the associated circuit breaker. In order that the reclosure of a circuit breaker may be controlled by the real power that is flowing at the time a fault occurs and not by a transient in the power flow which may occur during the period a fault is on the circuit or after it has been cleared, each relay 25 is preferably designed in any suitable manner so that it does not close its contacts 26 until after its winding has been energized for a predetermined time. Also in order to insure that the closing circuit is completed for a sufficient time to close the circuit breaker, each relay is also designed so that it maintains its contacts 26 closed for a short time after its operating winding is de-energized.

With the arrangement shown in the drawing, a fault on the line 2 will cause the fault responsive means 12 respectively associated with the circuit breakers 7 and 8 to effect the opening of these circuit breakers and thereby disconnect the faulty line 2 from the buses 3 and 4. If at the time the fault occurs, the total power being transmitted over the lines 1 and 2 exceeds a predetermined value, all of the power relays 17 will have one of their respective sets of contacts closed so that their associated relays 25 will have their contacts 26 closed. Therefore, as soon as the circuit breakers 7 and 8 open so that their respective auxiliary contacts 15 are closed, an energizing circuit is completed for the closing coil 9 of each of these circuit breakers to effect a rapid reclosure thereof. However, if the total power being transmitted over the two lines 1 and 2 is below a predetermined value at the time the fault occurs, the power relays 17 associated with the circuit breakers 7 and 8 will not have either of their respective sets of contacts closed, and under these conditions the circuit breakers 7 and 8 will not be rapidly reclosed.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a plurality of parallel lines, a circuit breaker in one of said lines, means responsive to a fault on one of said lines for effecting the opening of said circuit breaker, and means dependent upon the amount of power flowing through said parallel lines at the time the fault occurs for controlling the reclosing of said circuit breaker.

2. In combination, a plurality of parallel lines, a circuit breaker in one of said lines, means responsive to a fault on one of said lines for effecting the opening of said circuit breaker, and means for effecting the reclosing of said circuit breaker only when the power flow through said lines exceeds a predetermined amount at the time the fault occurs.

3. In combination, a plurality of parallel lines, a circuit breaker in one of said lines, means responsive to a fault on one of said lines for effecting the opening of said circuit breaker, and means for effecting the reclosing of said circuit breaker only when the power flow through said lines at the time the fault occurs exceeds the amount the remaining lines can carry without becoming unstable.

4. In combination, a plurality of parallel lines, a circuit breaker in one of said lines, means responsive to a fault on one of said lines for effecting the opening of said circuit breaker, a power relay responsive to the total power being transmitted by said lines, and means controlled by said power relay for rapidly reclosing said circuit breaker after it opens if the total power being transmitted by said lines exceeds a predetermined amount when the fault occurs.

5. In combination, a plurality of parallel lines, a circuit breaker at each end of each line, means responsive to a fault on a line for effecting the opening of the circuit breakers at the ends thereof, and means dependent upon the amount of power flowing through said parallel lines at the time the fault occurs for controlling the reclosing of circuit breakers in the faulty line.

6. In combination, a plurality of parallel lines, a circuit breaker at each end of each line, means responsive to a fault on a line for effecting the opening of the circuit breakers at the ends thereof, and means for effecting the reclosing of the circuit breakers in the faulty line only when the power flow through said parallel lines exceeds a predetermined amount at the time the fault occurs.

7. In an alternating current system, a plurality of parallel lines, a circuit breaker in one of said lines, means responsive to a fault on one of said lines for effecting the opening of said circuit breaker, means responsive to a predetermined electrical condition of said lines indicative that the reclosing of said circuit breaker will prevent a loss of synchronism between the various parts of the system, and means dependent upon the position of said electrical condition responsive means at the instant when a fault occurs for automatically reclosing said circuit breaker.

8. In an alternating current system, a plurality of parallel lines, a circuit breaker in each line, means responsive to a fault on a line for effecting the opening of the circuit breaker therein, means responsive to a predetermined electrical condition of said lines indicative that the reclosing of a circuit breaker in a faulty line will prevent a loss of synchronism between the various parts of the system, and means dependent upon the position of said electrical condition responsive means at the instant when a fault occurs for automatically reclosing the circuit breaker in the line on which the fault occurs.

SELDEN B. CRARY.